UNITED STATES PATENT OFFICE.

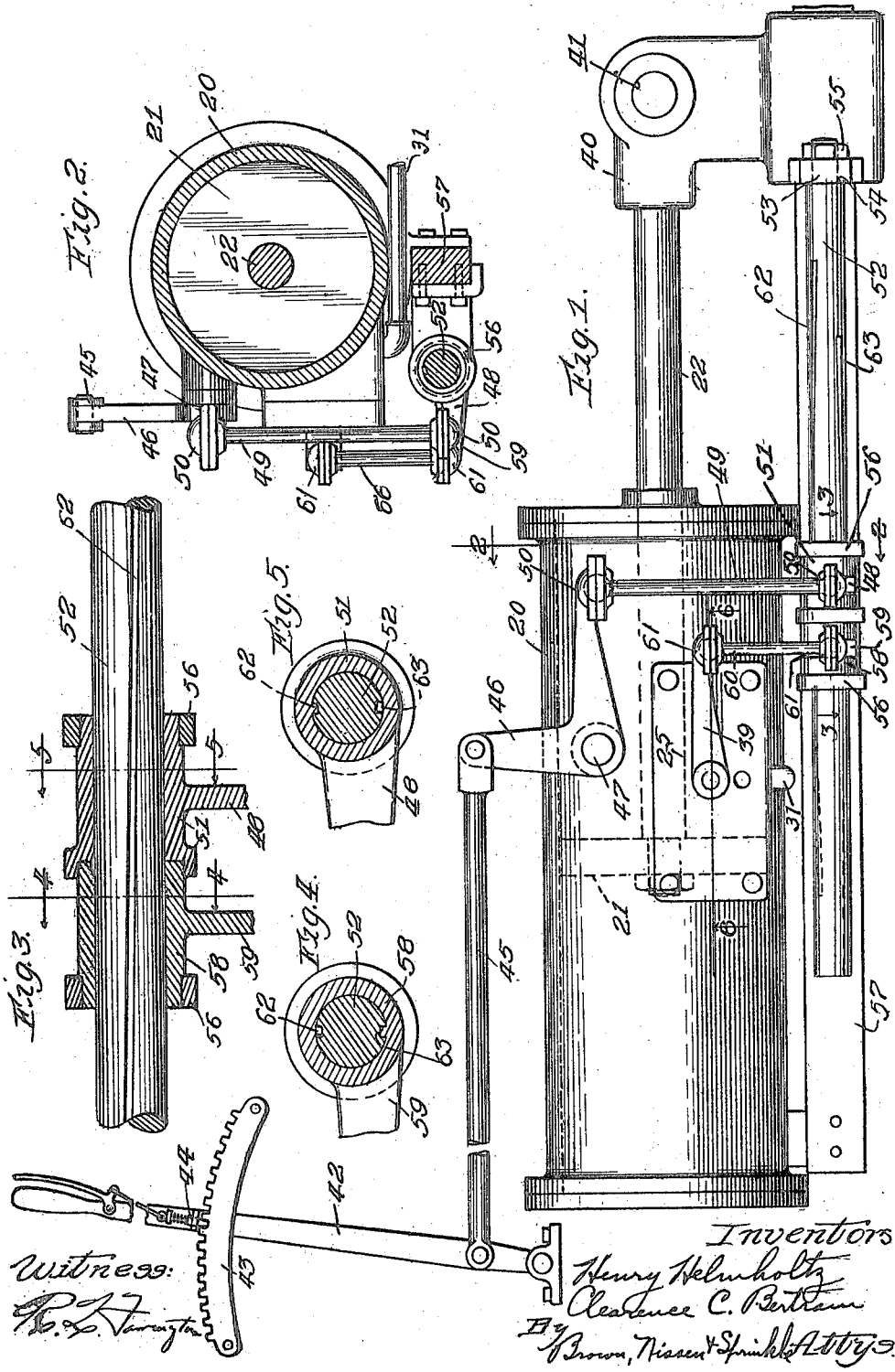

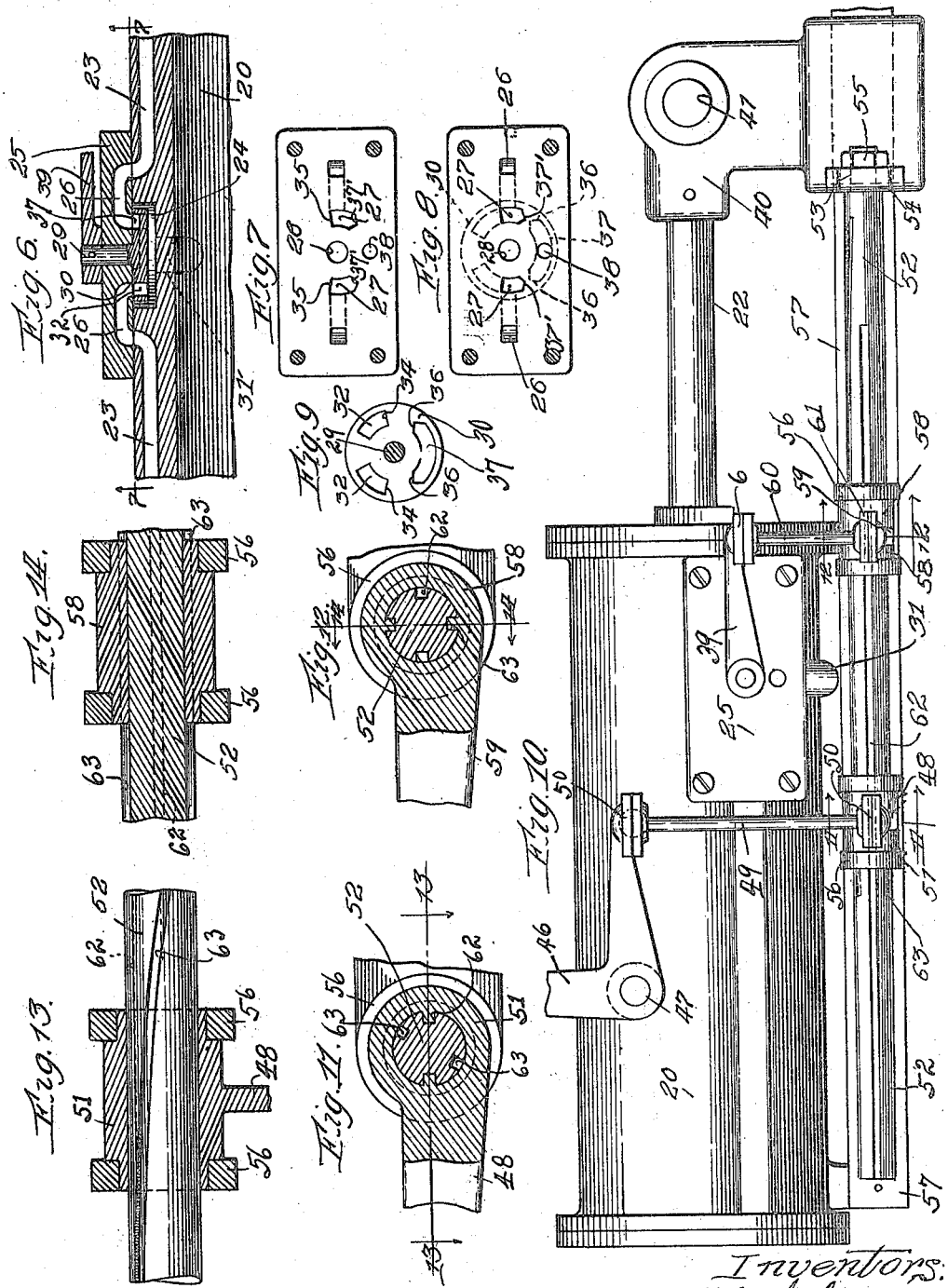

HENRY HELMHOLTZ AND CLARENCE C. BERTRAM, OF CHICAGO, ILLINOIS.

LOCOMOTIVE REVERSING-GEAR.

1,208,555. Specification of Letters Patent. Patented Dec. 12, 1916.

Application filed March 2, 1916. Serial No. 81,576.

*To all whom it may concern:*

Be it known that we, HENRY HELMHOLTZ and CLARENCE C. BERTRAM, citizens of the United States, residing at Chicago, in the county of Cook and State of Illinois, have invented certain new and useful Improvements in Locomotive Reversing-Gears, of which the following is a specification.

Our invention relates to mechanism for operating the valves of locomotives and the like, and has for its object the provision of simple and efficient means adapted to be connected to the valve of an engine or locomotive and operated by a fluid under pressure, such as compressed air or steam under pressure, for operating and controlling said valve.

Other objects will appear hereinafter.

An embodiment of our invention is shown in the accompanying drawings forming a part of this specification and in which—

Figure 1 is a side elevation of a fluid operating means for locomotive valves embodying our invention. Fig. 2 is a section of the same taken on line 2—2 of Fig. 1. Fig. 3 is an enlarged fragmental section taken on line 3—3 in Fig. 1. Figs. 4 and 5 are sections taken on lines 4—4 and 5—5 respectively of Fig. 3. Fig. 6 is a fragmental section taken on line 6—6 in Fig. 1. Fig. 7 is a view taken on line 7—7 of Fig. 6. Fig. 8 is a view similar to Fig. 7 except that a valve used in the construction is shown on dotted lines in its operating position. Fig. 9 is a view of a valve used in the construction viewed as looking downwardly from line 7—7 in Fig. 6. Fig. 10 is a view similar to Fig. 1 showing certain modifications therein. Fig. 11 is an enlarged view taken on line 11—11 of Fig. 10. Fig. 12 is an enlarged fragmental section taken on line 12—12 of Fig. 10. Fig. 13 is a view taken on line 13—13 in Fig. 11, except that the shaft is shown in elevation; and, Fig. 14 is a section taken on line 14—14 of Fig. 12.

In locomotives, and especially those of large types, a great amount of force is required to operate the valve gear to reverse the direction of travel of the locomotive or to change the speed of the locomotive. Ordinarily the valve gears of locomotives are moved manually by a suitable lever mounted conveniently to the engineer. It is the purpose of our invention to provide a compressed fluid operable means for moving the valve gear to control the valve. Said fluid operable means is controlled by a small throttling lever connected to said means which is easily operated regardless of the size of the locomotive.

Referring more particularly to the drawings we have shown a fluid cylinder 20 having a piston 21 mounted therein and a piston rod 22 extending from the piston out through the end of the cylinder in a manner similar to that employed in conventional steam engines. The admission of fluid to the cylinder 20 is controlled by a suitable valve which may be of any desired form. To show an operable means we have indicated one form in these drawings, but it is understood that any other form of valve for controlling the supply and exhaust of fluid to and from the cylinder 20 may be used. In the construction illustrated the cylinder 20 is provided with passages 23 which extend from the ends of the cylinder to a valve chest which is composed of a recess 24 formed in one side of the cylinder 20 and a plate 25 secured to the cylinder over the recess 24. The plate 25 is provided with passages 26 which extend from the ends of passages 23 to the face of the plate 25 directed toward the recess 24. Substantially equi-distant between the openings 27 of passages 26 is an opening 28 in which is mounted a valve stem 29. The valve stem 29 is rotatably mounted in the opening 28 and carries a valve 30 in the recess 24. The valve 30 and its engaging portion of plate 25 are fitted together to provide a fluid-tight joint therebetween. The valve 30 is held against the plate 25 by the pressure of fluid in recess 24 pressing against the valve. Fluid, such as compressed air, is admitted to the valve chest through a pipe 31 leading from a suitable source of compressed air or other fluid, not shown.

The valve 30 is provided with two openings 32 which extend entirely therethrough and provide means for passing compressed fluid from recess 24 through passages 26 and 23 to the interior of the cylinder 20, as shown in Fig. 8. The edges 34 of the openings 32 are adapted to lie directly over the edges 35 of the openings 27 when the valve 30 is in normal condition, or when the piston is at rest. When the edges 34 and 35 are engaging each other as just explained, the points 36 of an arcual recess 37 in the valve 30 are spaced slightly from the points 37' of openings 27 to seal the joint between the openings 27 and the recess 37. This prevents the compressed fluid from passing from openings 27 into recess 37 and out through the exhaust passage 38. By providing such an arrangement when the piston 21 is at rest, the edges 34 and 35 cut off a certain portion of the compressed fluid in the cylinder at both sides of the piston, thereby locking the piston in such position. In case there is a leakage in the cylinder at one side of the piston, the compressed fluid can pass into the end of the cylinder having such leakage to supply the loss of compressed fluid, thereby preventing a movement of the piston in the cylinder.

When it is desired to move the piston 21, the valve 30 is moved by suitable mechanism connected to a lever 39 secured to the valve stem 29. In the movement of the valve 30 one of the edges 34 passes over one of the edges 35 permitting a communication between one of the openings 27 and one of the openings 32 and destroying communication between the other of the openings 27 and the other opening 32. The movement of the valve 30 also moves one of the points 36 over one of the points 37' permitting a communication between the adjacent opening 27 and the recess 37 to establish communication between the exhaust pipe 38 and the last mentioned opening 27. This arrangement permits the piston to be moved in one direction by the pressure of the fluid. From the description of the movement of valve 30 just described, it will be evident that upon rotating valve 30 in the other direction, piston 21 will be moved in the opposite direction.

The piston rod 22 is connected to a crosshead 40 which is provided with an opening 41 adapted to be connected with the reversing gear of an engine or locomotive valve to operate and control the latter. The connection, valve gear or valve mechanism of the locomotive are not shown since their description and operation are old and well known.

In order to control the fluid operating means for operating the valve gear, we provide a throttle lever 42 which may be mounted in a suitable position convenient to the engineer. The lever is adapted to coöperate with a locking sector 43 in a manner to hold the lever in desired positions by the spring lock 44 on the lever. The lever 42 is connected by means of a connecting rod 45 to a lever 46. In the present instance the lever 46 is a bell crank lever pivoted as at 47 on the outer part of the cylinder 20. The lever 46 is connected to a second lever 48 by means of a connecting rod 49 and ball joints 50. The lever 48 is formed on a collar 51 and the latter splined to a shaft 52. The shaft 52 is rotatably mounted at one of its ends in an ear 53 on the crosshead 40. The shaft 52 is provided with a shoulder 54 at one side of ear 53 and a nut 55 at the other side of said ear to cause the shaft to move longitudinally with the crosshead 40 and piston rod 22. The collar 51 is journaled in an arm 56 and the latter secured to a bar 57 carried on the lower side of the cylinder, see Fig. 2. A collar 58 is also splined on the shaft 52 and journaled in an arm 56 also carried on the bar 57. The collar 58 is provided with an arm 59 connected to the lever 39 by means of a connecting rod 60 and ball joints 61 so that upon movement of the manually operable lever 42 the collar 51 is rotated and rotates shaft 52 which in turn rotates collar 58 to rotate valve 30 through the connecting mechanism.

In order to move the piston 21 a desired distance and lock it at the end of such distance, we provide special splining connections between the collars 51 and 58 and shaft 52. In Fig. 1 the collar 51 is splined to shaft 52 in a spiral groove 62 and the collar 58 is splined to the shaft 52 in a spiral groove 63. The spiral grooves 62 and 63 extend around the shaft 52 in converging directions, resembling right hand and left hand screw threads. The pitch or inclination of the grooves 62 and 63 are such that when the lever 42 is moved from one end of the locking sector 43 to the other end of the latter, the piston 21 can be moved from one end of cylinder 20 to the other end of the latter. Intermediate movements of lever 42 also cause corresponding intermediate movements of the piston 21 in the the cylinder 20. The arrangement is such that when lever 42 is moved in one direction a certain distance, lever 48 will rotate shaft 52 a corresponding distance. This rotation of shaft 52 rotates collar 58, thereby moving the valve 30 to permit the compressed fluid to enter the cylinder and move the piston. Since the grooves 62 and 63 are spiral, upon the piston 21 moving in the cylinder 20, shaft 52 will be slid longitudinally thereof through the collars 51 and 58 causing the sliding of the shaft 52 through the collar 51 to rotate the shaft and this rotation of the shaft together with the shaft sliding through collar 58 causes the collar 58 to be rotated in the reverse direction the same distance it was rotated by the movement of lever 42. This restores valve 30 to its normal condition indicated in Fig. 8 and arrests the movement of piston 21 causing the compressed fluid imprisoned at both sides of the piston in the cylinder to lock the piston in such new position. The farther lever 42 is moved, the longer it will take the shaft 52 to move collar 58 backwardly to bring the valve 30 back to its normal position and stop the movement of the piston. Also by moving the lever 42 rearwardly from the position indicated in Fig. 1 the piston 21 will be moved rearwardly a corresponding distance to the movement of the lever. With this arrangement then the distance lever 42 is moved, controls the distance the piston 21 will be moved, and consequently the movement of the valve of the locomotive, not shown.

In Figs. 10 to 14 inclusive we have shown a slightly different arrangement of the collars 58 and 51 indicating that the arrangement of these parts may be arranged to suit different requirements. Also in these figures we have shown the splined connection between the shaft 52 and the groove 62 modified from that already described. In this form the groove 62 extends parallel with the axis of the shaft 52. Also each of the grooves 62 and 63 are shown in duplicate, one of the grooves 62 being diametrically opposite the other and one of the grooves 63 being diametrically opposite the other. In providing two of each of the grooves 62 and 63 the strain on the grooves is lessened from that where there is but one groove, thereby minimizing the wear between the grooves and portion of the collars 51 and 58 engaging the grooves.

Since the grooves 62 in Figs. 10 to 14 inclusive are straight, it is necessary to increase the angularity of grooves 63 in order to move the collar 58 the required distance to operate the valve 30. In the construction in Figs. 10 to 14 inclusive the shaft 52 is rotated by the throttle lever 42 in the same manner as that described for Figs. 1 to 9 inclusive. However when the piston moves in the form shown in Fig. 10 the shaft is held against rotation by the straight groove 62 engaging the collar 51. The movement of the shaft 52 longitudinally however during the movement of piston causes the collar 58 to rotate twice as far relative to the shaft as it did in Fig. 1.

In the arrangement of two spiral grooves as shown in Fig. 1 the angularity of the grooves is considerably less, thereby producing very little friction in the longitudinal movement of the shaft 52 through the collars, while in the form shown in Fig. 10 the angularity of groove 63 is considerably greater, thereby increasing the friction on the shaft 52 in passing through the collars. Furthermore by increasing, slightly, the angularity of grooves 62 and 63 in Fig. 1 it is possible to increase the throw of throttle lever 42, thereby providing a means so that the adjustment of lever 42 will move the valve 30 less to give a nicer adjustment of the valve 30 than can be obtained where the throw of lever 42 is comparatively short.

While we have illustrated and described the preferred forms of our invention, we do not desire to be limited to the precise details set forth, but desire to avail ourselves of such variations and changes as come within the scope of the appended claims.

We claim:

1. In combination, a working cylinder having fluid passages communicating therewith; a valve for controlling communications through the fluid passages; a piston in the cylinder; a crosshead connected to move with the piston; a shaft having one end journaled in the crosshead and grooves therein; a throttle means; a connection between the throttle means and one of the grooves in the shaft; and a connection between the other groove in the shaft and said valve.

2. In combination, a working cylinder having fluid passages communicating therewith; a valve for controlling communications through the fluid passages; a piston in the cylinder; a head connected to move with the piston; a shaft having one end journaled in the crosshead and grooves therein disposed angularly to each other in a generally longitudinal direction of the shaft; a throttle means; collars on the shaft, each collar having a portion extending into one of the grooves of the shaft; a connection between the valve and one of said collars; and a connection between the other collar and the throttle means.

3. In combination, a working cylinder having fluid passages communicating therewith; a valve for controlling communications through the fluid passages; a piston in the cylinder; a shaft connected with the piston and having grooves therein disposed angularly to each other and in a generally longitudinal direction of the shaft; a throttle means; fixed bearings; collars mounted on the shaft and journaled in said bearings, each collar having a portion extending into one of the grooves of the shaft; and operative connections connecting the collars with the valve and throttle means.

4. In combination, a working cylinder having fluid passages communicating therewith; a valve for controlling communications through the fluid passages; a piston in the cylinder; a shaft having its axis substantially parallel with the axis of the cylinder and connected with the piston to be moved by the latter; a throttle means; a connection between the throttle means and the shaft; and a connection between the valve and the shaft, said throttle means being adapted to operate through said connections, rotate the shaft, and open the valve, and the piston being adapted to move the shaft with respect to said connections and close the valve.

5. In combination, a working cylinder having fluid passages communicating therewith; a valve for controlling communications through the fluid passages; a piston in the cylinder; a shaft having its axis substantially parallel with the axis of the cylinder and connected with the piston to be moved by the latter, there being converging grooves in said shaft; a throttle means; and a connection between the throttle means and valve including the shaft, whereby movement of the throttle means opens the valve and movement of the piston operating through the shaft and other portions of said connection closes the valve.

6. In combination, a working cylinder having fluid passages communicating therewith; a valve for controlling communications through the fluid passages; a piston in the cylinder; a shaft having its axis substantially parallel with the axis of the cylinder and connected with the piston to be moved by the latter, there being two spiral grooves in the shaft converging toward each other; a throttle means connected with one of said spiral grooves; and a connection between the other of said spiral grooves and said valve, the movement of said piston being adapted to move the shaft longitudinally causing rotation of the shaft to facilitate moving the valve.

7. In combination, a fluid working cylinder; a piston in the cylinder; a valve connected with the cylinder for controlling movements of the piston; a shaft connected with the piston for longitudinal movement with the latter and having spiral grooves therein; a connection between one of the grooves of the shaft and said valves adapted to close the latter upon operation of the piston; and means connected with another of said grooves for rotating the shaft to open said valve.

8. In combination, a fluid working cylinder; a piston in the cylinder; a valve connected with the cylinder and adapted to control movements of the piston in the cylinder; a shaft connected with the piston for movement with the latter, said shaft having a spiral groove therein; a member splined on said shaft in said spiral groove and held against longitudinal movement with respect to the shaft; an operative connection between said member and said valve; and manually operable means connected with the shaft for rotating the same.

9. In combination, a working cylinder; a piston mounted in the cylinder; a valve connected with the cylinder and adapted to control operation of the piston; a crosshead connected with the piston, a shaft having one end journaled in the crosshead and adapted to move longitudinally with said crosshead, there being spiral grooves in said shaft; bearings; sleeves journaled in said bearings, said shaft being slidably and rotatably mounted in said sleeves; feathers carried by said sleeves and slidably mounted in said grooves; an operative connection between one of said sleeves and said valve whereby longitudinal movement of the shaft rotates said sleeve to close said valve; and a manually operable means connected with another of said sleeves for rotating such sleeve to open said valve.

In testimony whereof we have signed our names to this specification, in the presence of two subscribing witnesses, on this 19th day of February, A. D. 1916.

HENRY HELMHOLTZ.
CLARENCE C. BERTRAM.

Witnesses:
M. T. HACKLEY,
HARRY B. STRUBY.

Copies of this patent may be obtained for five cents each, by addressing the "Commissioner of Patents, Washington, D. C."